United States Patent [19]

Bouvot

[11] Patent Number: 4,735,127
[45] Date of Patent: Apr. 5, 1988

[54] DEVICE FOR CONTROLLING THE DISPLACEMENT OF A MOVING MEMBER SUCH AS A FLAP IN AN INSTALLATION FOR HEATING AND VENTILATING OR FOR AIR CONDITIONING A MOTOR VEHICLE

[75] Inventor: Jean-Francois Bouvot, Dampierre, France

[73] Assignee: VALEO - Societe Anonyme francaise, Paris, France

[21] Appl. No.: 940,575

[22] Filed: Dec. 12, 1986

[30] Foreign Application Priority Data

Dec. 13, 1985 [FR] France .................. 85 18542

[51] Int. Cl.⁴ ........................... F15B 9/10
[52] U.S. Cl. ......................... 91/376 R; 91/357; 91/375 R; 98/2
[58] Field of Search ........... 91/375 R, 376 R, 357; 98/2

[56] References Cited

U.S. PATENT DOCUMENTS

| | | | |
|---|---|---|---|
| 3,072,108 | 1/1963 | Cripe | 91/357 |
| 4,580,758 | 4/1986 | Bouvot | 91/357 X |
| 4,665,799 | 5/1987 | Bouvot | 91/375 R |

FOREIGN PATENT DOCUMENTS

| | | |
|---|---|---|
| 0053462 | 6/1982 | European Pat. Off. . |
| 2403316 | 8/1975 | Fed. Rep. of Germany . |
| 2536124 | 5/1984 | France . |
| 2553858 | 4/1985 | France . |
| 59-153609 | 9/1984 | Japan . |
| 59-10000 | 9/1984 | Japan . |
| 2064825 | 6/1981 | United Kingdom . |

Primary Examiner—Robert G. Nilson
Attorney, Agent, or Firm—Dennison, Meserole, Pollack & Scheiner

[57] ABSTRACT

The device for controlling the displacement for a moving member such as a flap (46) includes a fluid distributor valve (10) actuated by control means (18) and suitable for connecting a single-action actuator (38) to a source of fluid under pressure, or to an exhaust, or for isolating said actuator from said source and said exhaust. The piston rod (40) of the actuator is connected to a moving element (14) of the distributor valve and also to the moving member (46) by common motion transmission means. The invention is applicable, in particular, to controlling flaps in installations for heating and ventilating or for air conditioning motor vehicles.

9 Claims, 3 Drawing Sheets

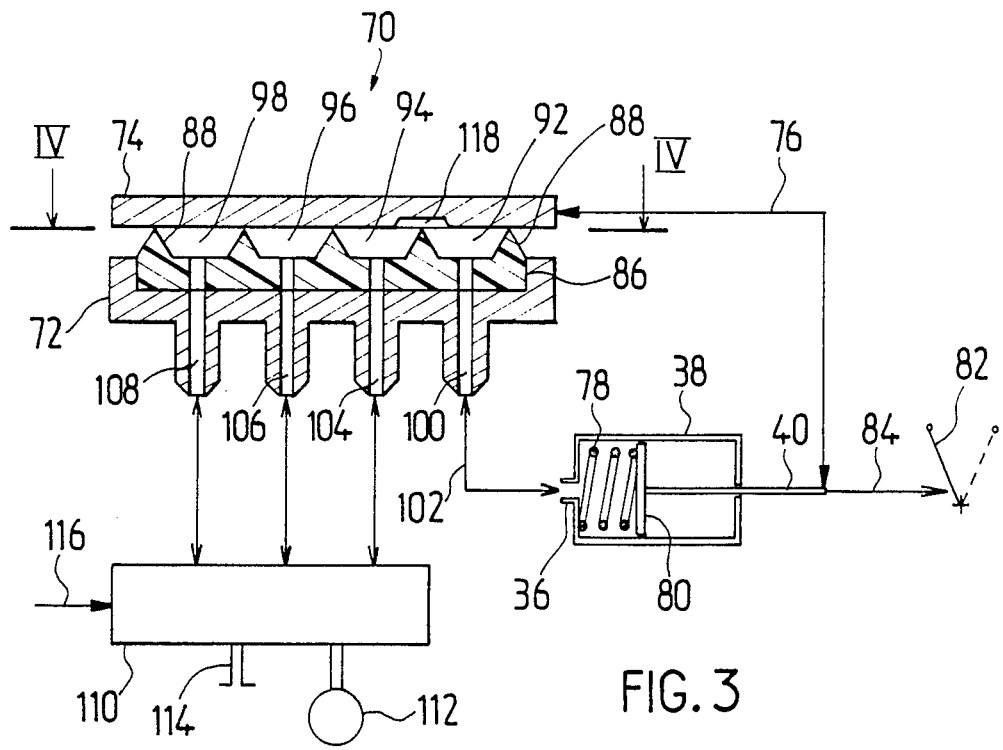
FIG. 3
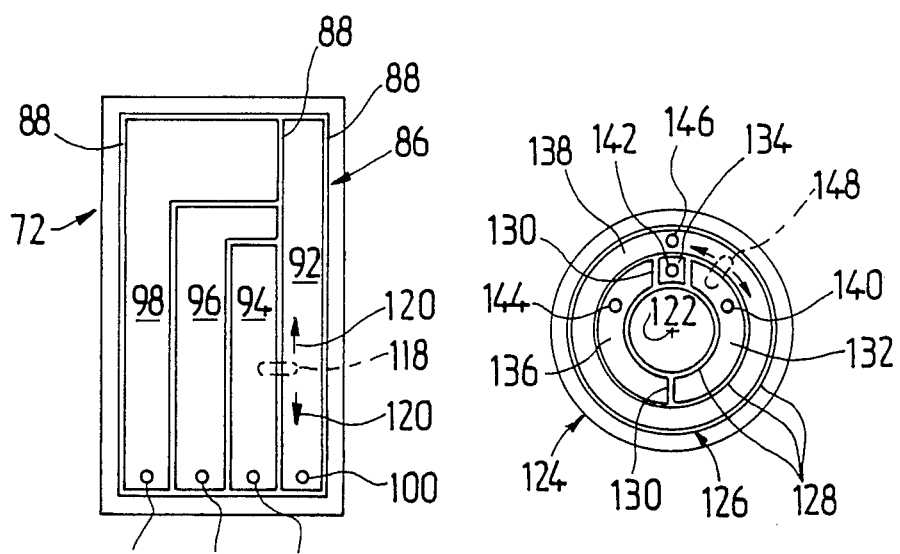
FIG. 4
FIG. 5

DEVICE FOR CONTROLLING THE DISPLACEMENT OF A MOVING MEMBER SUCH AS A FLAP IN AN INSTALLATION FOR HEATING AND VENTILATING OR FOR AIR CONDITIONING A MOTOR VEHICLE

The invention relates to a device controlling the displacement of a moving member, such as a flap, in an installation for heating and ventilating or for air conditioning a motor vehicle.

BACKGROUND OF THE INVENTION

In the prior art, such a flap is generally displaced by mechanical control means (a knob or a lever) disposed on the vehicle dashboard and connected to the flap by mechanical motion transmission means including levers and cable(s). This often results in the flap being stiff to maneuver.

Proposals have thus already been made to move such a flap by means of a single-action actuator whose piston rod is connected to the flap to be moved and also to a fluid distributor valve which is actuated by the control means provided on the vehicle dashboard and which is connected firstly to the actuator feed orifice and secondly to a source of fluid under pressure and to an exhaust. In a motor vehicle, the source of fluid under pressure is generally air at reduced pressure, i.e. at a pressure that is less than atmospheric, with the low pressure air being taken from the inlet manifold of the internal combustion engine of the vehicle, and the exhaust being constituted by a simple connection to the atmosphere. As a result, the flap generally becomes much easier to maneuver, since it requires the user to apply a substantially constant force to the control means, and the flap generally returns automatically to a privileged safety position in the event of a fault or an interruption in the source of fluid under pressure.

Generally speaking, the fluid distributor valve used comprises a first moving element which is moved by the control means provided on the dashboard, and a second moving element which is connected by motion transmission means to the flap to be displaced, with said two moving elements of the distributor valve defining fluid chambers therebetween which are selectively connected firstly to the source of fluid under pressure or the exhaust by means of ducts in the first moving element, and secondly to the actuator feed orifice by means of a duct in the second moving element.

In order to reduce the maneuvering force which a user must apply to the control means, proposals have already been made to mount the fluid distributor valve on the dashboard so that its first moving element may be fixed directly to the control means and can thus be directly driven by the user. The actuator is generally in the vicinity of the flap to be displaced with its piston rod being directly connected to said flap or to a shaft on which the flap is mounted. In this case, the length of the fluid connection between the distributor valve and the actuator is generally rather long, and the means for transmitting motion from the flap to the second moving element of the distributor valve also become rather long so that the connection loop between the fluid valve, the actuator, and the flap is long, thereby reducing the speed and accuracy of control.

One of the aims of the present invention is to mitigate this drawback.

Another aim of the invention is to provide a device for controlling the displacement of a moving member, such as a flap, which device is particularly compact and capable of being standardized with the standardized device being adapted to a given flap by adapting solely the mans for transmitting motion between said device and the flap.

Another aim of the invention is to provide such a control device which also has the advantage of having fixed fluid connections to the source of fluid under pressure and to the actuator.

SUMMARY OF THE INVENTION

The present invention provides a device for controlling the displacement of a moving member, such as a flap in an installation for heating and ventilating or for air conditioning a motor vehicle, the device comprising a single-action actuator having a piston rod connected to the moving member by motion transmission means, a fluid distributor valve connected to a feed orifice of the actuator, to a source of fluid under pressure, and to an exhaust, and means for controlling the distributor valve for feeding the actuator with fluid under pressure, for connecting it to the exhaust, or for isolating it from the source of fluid and from the exhaust, the distributor valve including a moving element which is connected to the moving member by motion transmission means in such a manner as to follow the displacement of the moving member, the device including the improvement whereby the distributor valve, the actuator, and the control means constitute a compact assembly in which the length of the fluid connection between the distributor valve and the actuator is reduced to a minimum, with the piston rod of the actuator being connected to the moving element of the distributor valve and to the moving member by the same motion transmission means.

Thus, in accordance with the invention the control device may be mounted on a vehicle dashboard and is connected to the moving member to be displaced by conventional means for transmitting motion.

In this device, the connection loop between the distributor valve, the actuator and the moving member is replaced by a connection loop between the distributor valve and the actuator, and this loop may be very short.

Preferably the fluid connection between the distributor valve and the actuator is fixed.

In this case, the fluid distributor valve comprises a fixed element which co-operates with the above-mentioned moving element and which is connected to the actuator inlet orifice by a duct constituting said fixed fluid connection.

This prevents the duct from moving together with the movements of the moving element of the distributor valve to which it was connected in the prior art.

In a particular embodiment of the invention, the fixed element and the moving element of the distributor valve determine chambers therebetween which are separated from one another in sealed manner, with one of the chambers being permanently connected to the feed orifice of the actuator and with the other chambers being suitable for connection to the source of fluid under pressure and to the exhaust and for being isolated therefrom, with the moving element of the distributor valve including a fluid passage having one end which opens out into the chamber connected to the actuator and having its other end opening out into one of the other chambers as a function of the position of the moving member.

BRIEF DESCRIPTION OF THE DRAWINGS

Embodiments of the invention are described by way of example with reference to the accompanying drawings, in which:

FIG. 3 is a diagram of another control device in accordance with the invention;

FIG. 4 is a section on line IV—IV of a portion of the device shown in FIG. 3; and FIG. 5 is a view corresponding to FIG. 4 but for a variant embodiment.

MORE DETAILED DESCRIPTION

Figure 1:
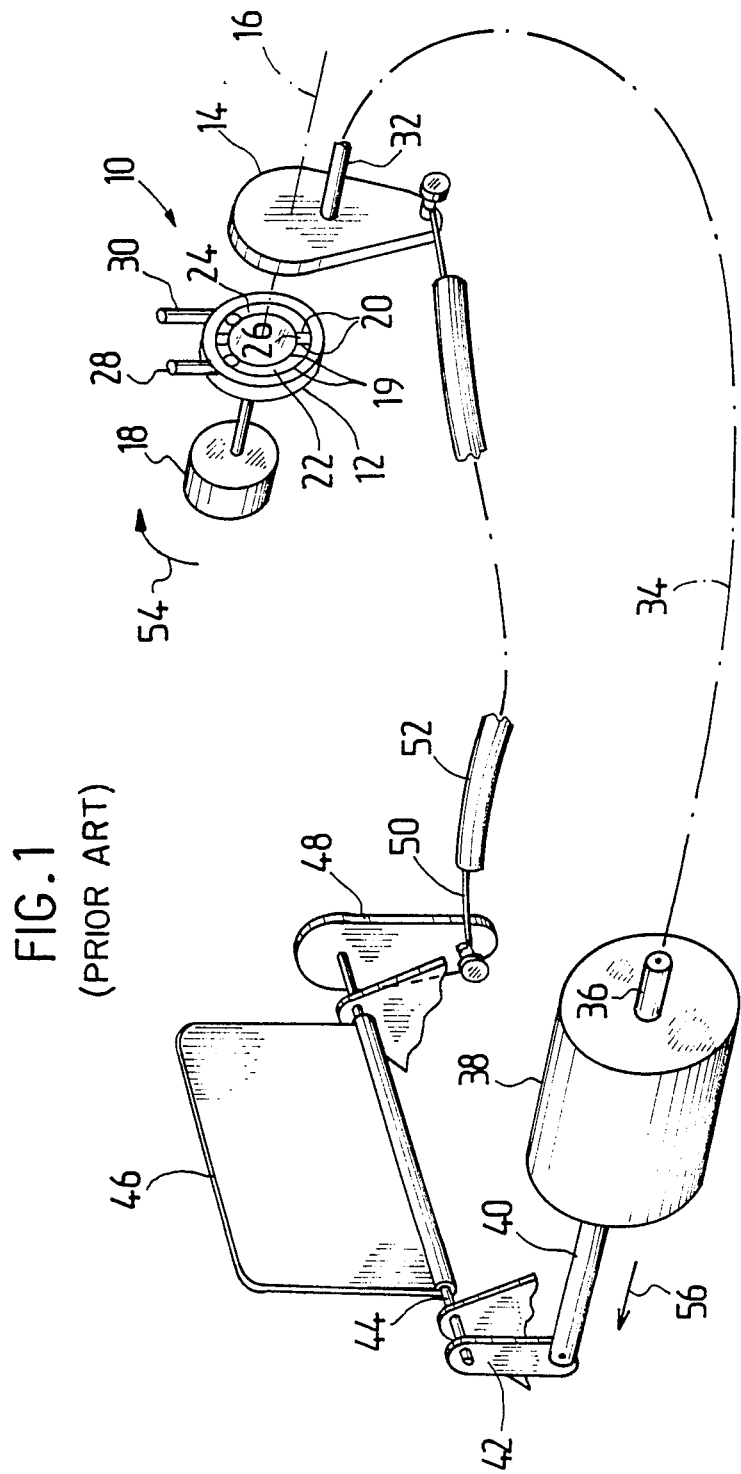
FIG. 1 is a diagram showing a prior art device for controlling the displacement of a flap by means of a single action actuator and a fluid distributor valve.

Reference is made initially to FIG. 1 which is a diagram of a prior art device used, for example, for controlling the displacement of a flap which forms a part of an installation for heating and ventilation or for air conditioning a motor vehicle.

This device comprises a fluid distributor valve 10 mounted on the vehicle dashboard and constituted by two moving elements 12 and 14 which, in this example, are substantially disk-shaped and rotatably mounted about a common axis 16.

The moving element 12 of the distributor valve is fixed to control means 18, for example a knob which is rotatable about the axis 16 and which is rotated by hand by a user. The elements 12 and 14 of the distributor valve are pressed against each other in order to delimit fluid chambers therebetween. A lining of rubber or similar material covers, for example, that face of the element 12 which faces the element 14, with said lining including two concentric circular ribs 19 together with radial ribs 20 extending between the circular ribs 19 in order to delimit two substantially semi-annular chambers 22 and 24 therebetween, i.e. two chambers each of which extends over slightly less than 180°, with said chambers being separated from each other by a small intermediate chamber 26.

The moving element 12 of the distributor valve includes a duct or end fitting 28 for connection to a source of fluid under pressure at one end and having its other end opening out into the chamber 22, together with another duct or end fitting 30 for connection to the atmosphere (or to an exhaust) at one end and whose other end opens out into chamber 24.

The other moving element 14 of the distributor valve includes a fluid passage formed by an end fitting 32 having one end which opens out in that face of the element 14 which faces the element 12 between the two concentric ribs 19 of said element 12, i.e. into the chamber 22, or into the chamber 24, or else into the chamber 26, and whose other end is connected by a flexible hose 24 to the feed orifice 36 of a single-action actuator 38 which may be of the type shown in FIG. 3, for example. The piston rod 40 of the actuator is connected by a crank 42 to a shaft 44 which is fixed to the flap 46 that is to be moved. Motion transmission means comprising, for example, a crank 48 and a cable 50 guided in a fixed sheath 52 connect the shaft 44 of the flap 46 to the moving element 14 of the distributor valve.

This prior art device operates as follows:

When the end of the fitting 32 in the element 14 opens out into the small intermediate chamber 26 which is isolated from the source of fluid under pressure and from the exhaust, the actuator 38 is connected neither to the source of fluid under pressure nor to the exhaust, and as a result the flap 46 remains stationary.

If the user turns the control knob 18 in the direction indicated by arrow 54, the end of the fitting 32 in the element 14 will open out into the chamber 24 which is connected to the exhaust. As a result the actuator 38 is connected to the exhaust and its piston rod 40 moves in the direction of arrow 56, thereby rotating the flap 46 in the corresponding direction. This rotation is transmitted by the crank 48 and the cable 50 to the moving element 14 of the distributor valve which rotates about the axis 16 in the direction of arrow 54 until the end fitting 32 again opens out into the intermediate chamber 26. The actuator 38 is then again isolated from the source of fluid under pressure and from the exhaust and as a result the flap 46 and the moving element 14 of the distributor valve stop moving.

Inversely, if the user turns the control knob 18 in the direction opposite to that indicated by arrow 54, the end of the fitting 32 will open out into the chamber 22, thereby feeding the actuator with fluid under pressure and thus displacing its piston rod in the opposite direction to arrow 56 and rotating the flap 46 in the corresponding direction, thereby causing the element 14 of the distributor valve to rotate in the same direction as the control knob until the end of the fitting 32 opens out once again into the intermediate chamber 26, thereby stopping the system from moving.

This is thus a follower type control device with the angular displacement of the flap 46 being proportional to the angular displacement of the control knob 18.

However, it may be observed that the transmission loop which is associated with the distributor valve 10 is constituted by the hose 34 connecting the distributor valve to the actuator, and by the mechanical transmission system associating the actuator with the flap 46 and the flap 46 with the second moving element 14 of the distributor valve. This loop is thus very long when the distributor valve 10 is located on the dashboard of the vehicle, thereby reducing the speed and accuracy of the control.

Figure 2:
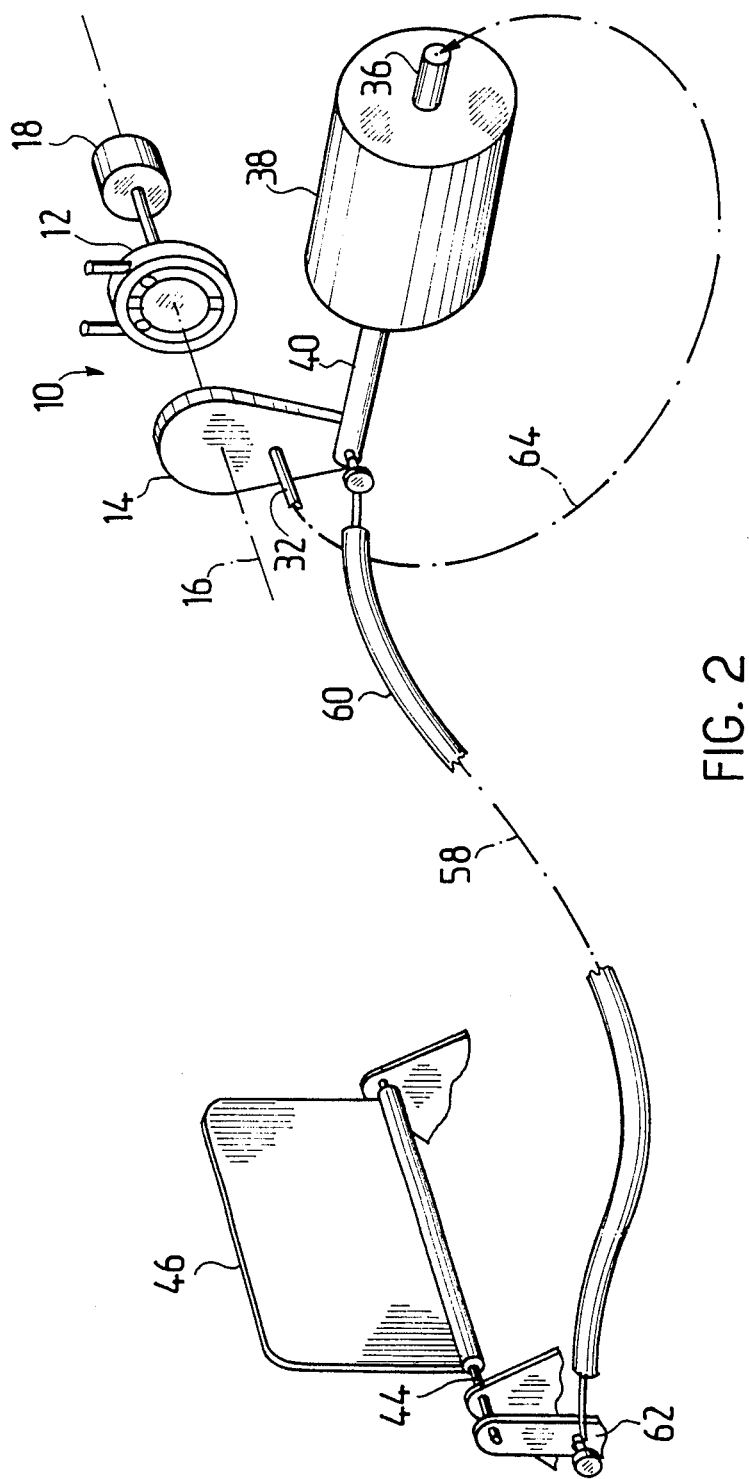
FIG. 2 is a view similar to FIG. 1, but showing a control device in accordance with the invention.

Reference is now made to FIG. 2 which shows a control device in accordance with the invention and suitable for overcoming this particular drawback.

In order to facilitate comparison between the invention and the prior art, FIG. 2 uses the same reference numerals as FIG. 1 for designating identical parts.

The control device shown in FIG. 2 thus comprises, as in FIG. 1, a distributor valve 10 having two moving elements 12 and 14 mounted to rotate about a common axis 16, with the element 12 being fixed to a control knob 18.

This device differs from that shown in FIG. 1 in that the actuator 38 is mounted in the immediate vicinity of the distributor valve 10, i.e. on the vehicle dashboard, with its piston rod 40 being directly articulated to the moving element 14 of the distributor valve about an axis which runs parallel to the axis of rotation 16. The assembly constituted by the piston rod 40 of the actuator 38 and by the moving element 14 of the fluid distributor valve is connected to the shaft 44 of the flap 46 by motion transmission means which are constituted in this case by a cable 58 guided in a fixed sheath 60 and by a crank 62. The end fitting 32 on the moving element 14 of the distributor valve is connected to the feed orifice 36 of the actuator via a hose 64 which may be very short, by virtue of the distributor valve being so close to the actuator.

The FIG. 2 device in accordance with the invention operates in the same way as the device shown in FIG. 1, but it can be seen that the transmission loop between the distributor valve and the actuator is constituted solely by the flexible hose 64 and the piston rod 40, and is thus a short loop which thereby improves the speed and accuracy of the control.

In addition, the device in accordance with the invention is capable of being standardized. In order to adapt it to a particular installation for heating and ventilating or for air conditioning a motor vehicle, all that needs to be done is to provide the appropriate transmission ratio between the piston rod 40 of the actuator and the shaft 44 of the flap 46, for example by providing a crank 62 of suitable length.

Reference is now made to FIGS. 3 and 4 which show another embodiment of a control device in accordance with the invention.

As mentioned above, the FIG. 2 device is a follower type device with the flap 46 being displaced by an amount which is proportional to the displacement of the control knob 18. The device shown in FIG. 3 serves to provide stepper displacement of the flap, i.e. to move it into predetermined positions with the number of such positions being determined by the structure of the distributor valve. The control means of this distributor valve (a slider or a rotary knob) may be moved to take up a predetermined number of positions, which positions may, for example, be equidistant and may correspond to predetermined flap positions which are not necessarily equidistant, so that flap motion is thus dissociated from the motion of the control means.

The distributor valve 70 in FIG. 3 comprises a fixed element 72 which in this case is in the form of a substantially rectangular plate and it is associated with a moving element 74 suitable for following the displacements of the piston rod 40 of the actuator 38, either by being directly displaced by said piston rod or else by being displaced by motion transmission means shown diagrammatically by line 76 in FIG. 3.

As can be seen in this figure, the actuator 38 is a single-action actuator comprising a compression spring 78 between its piston 80 and its end including the feed orifice 36. When the actuator is fed with reduced pressure, the piston 80 compresses the spring 78 and the piston rod 40 is drawn into the actuator 38, and when the actuator is connected to the exhaust, the spring 78 expands and the piston rod 40 moves out from the actuator.

The piston rod 40 is also connected to the flap 82 to be displaced by motion transmission means 76 which may be, for example, of the same type as shown in FIG. 2.

The face of the fixed element 72 which faces the moving element 74 has a lining 86 of rubber or like material, and a plan view thereof is shown on a smaller scale in FIG. 4. This lining has projecting ribs 88 which are applied in airtight manner against the moving element 74 and which delimit four chambers 92, 94, 96, and 98, each of which has a fluid passing duct opening out therein. The duct 100 opening out into the chamber 92 is connected to the feed orifice 36 of the actuator 38 via a duct or a flexible hose 102 which may be very short in length and which is fixed. The ducts 104, 106, and 108 which open out into chamber 94, 96, and 98 respectively are connected to three outlets from a conventional fluid distributor valve 110, for example a slide valve. Said valve has two inlets connected to the source 112 of fluid under pressure (i.e. to air at reduced pressure in a motor vehicle) and a single exhaust 114. The conventional valve 110 includes a moving element (not shown) which is directly moved by the control means 116 provided on the dashboard, and which enables each one of the ducts 104, 106, and 108 to be selectively connected to the source of fluid under pressure 112 or to the exhaust 114 or to be isolated in sealed manner from both the source 112 and the exhaust 114.

The chamber 92 which is connected by the duct 100 and the fixed hose 102 to the feed orifice of the actuator 38 is rectilinear in shape and extends over the full length of the lining 86. The chamber 94 adjacent to chamber 92 extends over a portion only of the length of the lining 86. The other two chambers 96 and 98 are substantially L-shaped, with the two L-shapes being stacked together round the projecting corner of the short chamber 94 so that the short arms of the L-shapes each extend up to the chamber 92 and are separated therefrom by a rib 88 of the lining 86.

The moving element 74 is a plane plate of rectangular outline and its face facing the fixed element 78 includes a groove 118 which is placed astride the rectilinear rib 88 which separates the chamber 92 from the other chambers 94, 96, and 98. The moving element 74 is displaced by the piston rod 40 and the transmission means 76 in rectilinear translation relative to the fixed element 72, back and forth in the directions indicated by arrows 102. Thus, depending on the position of the moving element 74 relative to the fixed element 72, the groove 118 puts the chamber 92 into communication either with the chamber 94, or with chamber 96, or else with the chamber 98, and as a result the feed orifice 36 of the actuator 38 is connected either to the duct 104, or to the duct 106, or else to the duct 108.

This device operates as follows:

Assume that the moving element 74 of the distributor valve is initially in a position relative to the fixed element 72 such that its groove 118 puts the chambers 92 and 94 into communication, as shown in FIG. 4. When the chamber 94 is connected by the valve 110 to the source 112 of the fluid under pressure, the actuator 38 is fed with air at less than atmospheric pressure and the piston rod 40 is retracted into the actuator 38 causing the flap 82 to rotate counter-clockwise (as shown in FIG. 3) until it encounters an abutment. This limit position of the flap corresponds to a limit position for the moving element 74 of the distributor valve, in which the groove 118 may be located, for example, close to the end of the lining 86 where the openings to the ducts 100 and 104 are also located.

If the control means 116 is then operated so that the duct 104 is connected to the exhaust and the duct 106 is isolated from the source 112 and from the exhaust 114, the actuator 38 is connected to the exhaust and its piston rod 40 will start moving out from the actuator 38 so that the flap 82 pivots clockwise from its anti-clockwise limit position. The motion of the piston rod 40 is transmitted to the moving element 74 of the distributor valve and its groove 118 thus moves towards the opposite end of the lining 86 until the moment when its puts the chamber 92 into communication with the chamber 96. The actuator 38 is then isolated from the source of fluid under pressure and from the exhaust, so the piston rod 40 stops moving and the flap 82 is held in an intermediate position.

If the control means 116 is then actuated so that the duct 106 is connected to the exhaust, the actuator 38 is again connected to the exhaust and the piston rod 40 continues its outward movement from the actuator 38 causing the flap 82 to continue rotating clockwise, for example until it comes to a limit position opposite to the first-mentioned limit position. This second limit position corresponds to the moving element 74 of the distributor being in a position such that its groove 74 puts the chamber 92 into communication with the chamber 98. If the chamber 98 is connected via its duct 108 and the valve 110 to the exhaust 114, the flap 82 is held in its second limit position. Similarly, if the chamber 98 is isolated by the valve 110, from the exhaust and from the source 112, the flap 82 will stop as soon as the groove 118 of the moving element 78 has moved into the chamber 98. However, if the chamber 98 is connected by the valve 110 to the source 112 of the fluid under pressure, the actuator 38 is supplied with reduced pressure and the valve 82 is thus caused to rotate counter-clockwise to return towards its intermediate position if the chamber 96 is isolated from the exhaust and from the source 112 or to its first limit position if the chamber 96 and the chamber 94 are both connected to the source 112 of fluid under pressure.

It will be understood that the distributor valve shown in FIGS. 3 and 4 give rise to displacement of the flap 82 which is not proportional to the displacement of the control means 116, but which is defined by the manner in which the chambers 94, 96, and 98 are arranged relative to one another.

Further, this device may be particularly compact and includes the additional advantage of the connection hoses between the distributor valve, the actuator, and the source of fluid under pressure being fixed. Displacement of the moving element of the distributor valve thus no longer moves these connection hoses and this may be particularly advantageous in the engine compartment of a motor vehicle where free space is generally rather limited.

FIG. 5 shows a variant of the embodiment shown in FIGS. 3 and 4, and in this variant the two elements of the distributor valve are disks as in the FIG. 2 embodiment, with one of the disks being rotatable about the common axis 122 on the disks.

In this case, the fixed element 124 of the distributor valve has a lining 126 of rubber or like material which is circular in outline and which includes three concentric circular ribs 128 together with radial ribs 130 which extend between the innermost circular ribs 128 so as to define three chambers 132, 134, and 136 therebetween, which chambers are separated from one another by radial ribs 130. The outermost circular ribs 128 define a continuous annular chamber 138.

The fixed element 128 of the distributor valve and its lining 126 have fluid ducts 140, 142, 144, and 146 passing therethrough and opening out respectively into the chambers 132, 134, 136, and 138, with the first three ducts being connected to the three outlets from a fluid distributor valve such as the valve 110 shown in FIG. 3 which is actuated by the control means 116 and which has two inlets connected to the source of fluid under pressure 112 and an exhaust 114, while the duct 146 is connected to the actuator feed orifice.

The moving element of the distributor valve (not shown in the drawing) is a plane disk which is pressed against the lining 126 of the fixed element 124 and which includes a groove 148 which is placed astride the middle circular rib 128 of the lining 126, and which, as a function of the angular position of the moving element relative to the fixed element 126, puts the chamber 138 into communication either with the chamber 132 or with the chamber 134 or else with the chamber 136. As in the previous embodiment, the moving element is displaced by the piston rod 40 of the actuator 38 via motion transmission means which transform the rectilinear motion of the piston rod 40 into rotary motion of the moving element of the distributor valve about the axis 122.

The operation of this embodiment is identical to that of the device shown in FIGS. 3 and 4.

I claim:

1. A device for controlling the displacement of a moving member, such as a flap in an installation for heating and ventilating or for air conditioning a motor vehicle, the device comprising a single-action actuator having a piston rod connected to the moving member by motion transmission means, a fluid distributor valve connected to a feed orifice of the actuator via a fixed fluid connection, to a source of fluid under pressure, and to an exhaust, and means for controlling the distributor valve for feeding the actuator with fluid under pressure, for connecting it to the exhaust, or for isolating it from the source of fluid and from the exhaust, the distributor valve including a moving element which is connected to the piston rod by motion transmission means in such a manner as to follow the displacement of the moving member, the device including the improvement whereby the distributor valve includes a fixed element co-operating with the said moving element and connected to the actuator feed orifice via said fixed fluid connection.

2. A device according to claim 1, wherein the fixed element of the distributor valve is connected to the source of fluid under pressure and to the exhaust via an additional distributor valve whidh is in turn actuated by the control means.

3. A device according to claim 1, wherein the connections between the fixed element of the distributor valve and the source of fluid under pressure and the exhaust are fixed fluid connections.

4. A device according to claim 1, wherein the fixed element and the moving element of the distributor valve determine a plurality of chambers therebetween, one of said chambers being permanently connected to the feed orifice of the actuator and the other chambers being suitable for connection to the source of fluid under pressure, to the exhaust, and for being isolated therefrom, with the moving element of the distributor valve including a fluid passage having one end opening out into said chamber connected to the actuator and having its other end opening out into one or other of the other chambers as a function of the position of the moving member.

5. A device according to claim 4, including a lining on said fixed element, the chamber permanently connected to the feed orifice of the actuator being rectilinear in shape and extending over the full length of the lining of said fixed element.

6. A device according to claim 5, wherein the other chambers comprise a second chamber adjacent to the first chamber permanently connected to the feed orifice, the second chamber extending over a portion only of the length of the lining, and third and fourth chambers substantially L-shaped, with the two L-shaped chambers being stacked together around the second chamber with the short lengths of the L-shaped chambers each extending up to the first chamber and being separated therefrom by a rib on said lining.

7. A device according to claim 4, including a lining on said fixed element, the chamber permanently connected to the feed orifice of the actuator being a continuous annular chamber defined between two circular concentric ribs of the lining of said fixed element.

8. A device according to claim 7, wherein the other chambers are defined by two circular concentric ribs and are separated from one another by radial ribs.

9. A device according to claim 4, including rib means separating the chamber permanently connected to the feed orifice of the actuator from the other chambers, the moving element of the distributor valve including a groove placed astride the rib means of the fixed element whereby, depending on the position of the moving element relative to the fixed element, the groove puts the chamber permanently connected to the feed orifice of the actuator into communication with selected ones of the other chambers.

* * * * *